United States Patent [19]
Pastor et al.

[11] 4,052,527
[45] Oct. 4, 1977

[54] RADIATION POLYMERIZED HOT MELT PRESSURE SENSITIVE ADHESIVES

[75] Inventors: Stephen D. Pastor, Edison; Martin M. Skoultchi, Somerset, both of N.J.

[73] Assignee: National Starch and Chemical Corporation, Bridgewater, N.J.

[21] Appl. No.: 766,026

[22] Filed: Feb. 7, 1977

[51] Int. Cl.² ............................................. C08F 2/46
[52] U.S. Cl. ............................ 428/463; 96/115 P; 204/159.22; 204/159.23; 260/47 UA; 427/207 B; 427/208; 427/54; 428/483; 428/51 H; 428/520; 526/292; 526/293; 526/320; 526/326
[58] Field of Search .............. 260/47 UA, 486 H; 204/159.22, 159.23; 427/54; 428/463

[56] References Cited
U.S. PATENT DOCUMENTS

| 3,004,073 | 10/1961 | Wismer et al. | 260/486 H |
| 3,575,925 | 4/1971 | Skoultchi | 260/47 UA |
| 3,793,293 | 2/1974 | Ray-Chauthuri et al. | 260/47 UA |

Primary Examiner—Richard B. Turer
Attorney, Agent, or Firm—Edwin Szala; Ellen T. Dec

[57] ABSTRACT

The present invention is directed to hot melt pressure sensitive adhesive compositions formed by copolymerizing at least one 3-(chlorinated aryloxy)-2-hydroxypropyl ester of an alpha, beta unsaturated carboxylic acid with acrylate based copolymerizable monomers, heating the resultant ethylenically saturated prepolymer to a temperature sufficient to render it fluid and flowable; coating onto a substrate and exposing to ultraviolet radiation.

8 Claims, No Drawings

RADIATION POLYMERIZED HOT MELT PRESSURE SENSITIVE ADHESIVES

BACKGROUND OF THE INVENTION

I. Field of the Invention:

This invention relates to improved pressure sensitive hot melt adhesives. More specifically, it relates to a novel process for the production of hot melt adhesives having pressure sensitive properties comprising the steps of interpolymerizing acrylic-based copolymers with selected photoinitiators to produce an ethylenically saturated prepolymer which is applied to a substrate and subjected to ultraviolet radiation. The use of this prepolymer enables the material to be applied in hot melt form and, upon exposure to ultraviolet radiation, to cure to provide a high molecular weight pressure sensitive adhesive displaying improved tack, cohesive strength and end use performance now only obtainable from solvent systems.

II. Brief Description of the Prior Art:

Pressure sensitive adhesive compositions comprise a class of adhesives which, when coated on a suitable substrate share the common characteristic of being agressively and permanently tacky at room temperature and are thus able to adhere to surfaces by the application of nothing more than manual pressure.

Hot melt adhesives are solid materials at room temperature. Application of heat melts the solid adhesive bringing it to the liquid or fluid state in which form it is applied to a substrate; on cooling, the adhesive then regains its solid form.

This invention is directed to a process for producing hot melt pressure sensitive adhesives, i.e. adhesives which are applied in the liquid or fluid state at elevated temperatures and, upon cooling, form solid coatings which are permanently tacky and which adhere on mere contact with adhesive receptive surfaces to which they are applied. Adhesives of this type may be applied to various substrates such as paper, cloth and plastic films and the resulting coated substrates may then be converted into tapes and labels which are especially useful in the packaging field for any number of applications involving marking, sealing, reinforcing or bonding or are useful in the pharmaceutical or health field for such applications as bandages.

In preparing a pressure sensitive hot melt adhesive, the desirable properties include a high cohesive strength at room temperature for good holding power, low shrinkage of the adhesive film on flexible plastic substrates and retention of pressure sensitive properties (i.e. tack retention) during storage and use together with a relatively fluid viscosity at commonly employed application temperatures of 120° to 180° C.

Acrylic polymers and copolymers have found extensive use as the base polymers in pressure sensitive adhesive lacquers or water-based systems mainly because of their clarity, adhesion to non-primed surfaces, good aging characteristics, as well as their excellent properties of tack, peel and cohesive strength. Many attempts to utilize acrylic polymers or copolymers in pressure sensitive hot melt adhesives have not proven successful because of difficulties associated with melt viscosity. In order to have a hot melt adhesive that is sufficiently fluid at application temperatures, either a very low molecular weight polymer must be used or a high molecular weight polymer must be extended with a high proportion of low molecular weight oils or resins (tackifiers) to reduce the melt viscosity. Both of these alternatives are undesirable since low molecular weight polymers will produce adhesives which lack cohesive strength and the use of expensive additives will frequently detract from the cohesion or tack of the resultant adhesive.

Previous attempts to render acrylic polymers or monomer/oligomer systems useful for hot melt applied pressure sensitive adhesives by incorporating therein photoinitiators and subjecting the compositions to actinic radiation have not been successful since it has been difficult to cure the compositions to the proper degree of tackiness. A usual result is an overcured, hard coating possessing little, if any, pressure sensitivity. Moreover, many of the photoinitiators were also sensitive to visible light wavelengths and this sensitivity caused further curing of the adhesive during storage or use thereof. Finally, for many applications such as surgical bandaging, it is necessary that any externally added components (e.g. photoinitiators) be fully bound into the final composition; many of the compositions of the prior art contained photoinitiators which leached out during use.

Attempts have also been made to utilize acrylic monomers sensitive to electron beam radiation to effect crosslinking thereof. These compositions suffer from the obvious disadvantages associated with electron beam bombardment, i.e. the necessary equipment required for producing such hard radiation as well as the cost and dangers associated therewith.

It is therefore an object of the present invention to provide a process for the production of pressure sensitive hot melt adhesives which display excellent properties of tack, tack retention and cohesive strength, yet which are characterized by relatively low melt viscosity for ease of application.

It is a further object to provide a process for the production of pressure sensitive hot melt adhesives which will be cured to the desired molecular weight by exposure to ultraviolet radiation and which which will remain tacky, without further spontaneous curing when exposed to visible light.

These and other objects will be apparent from the description which follows.

SUMMARY OF THE INVENTION

In accordance with the present invention, acrylatebased pressure sensitive hot melt adhesives are prepared by copolymerizing at least one 3-(chlorinated aryloxy)-2-hydroxypropyl ester of an alpha, beta unsaturated carboxylic acid with at least one acrylate-based copolymerizable monomer; heating the resultant ethylenically saturated prepolymer to a temperature sufficient to render it flowable and fluid; coating the fluid adhesive onto the desired substrate and thereafter exposing the adhesive coated substrate to ultraviolet radiation of wavelength 1800 to 4000 A for a period of time sufficient to crosslink the prepolymer.

The resulting adhesive coated surface possesses excellent tack, cohesive strength, and tack retention upon storing and use, contains no unbound photoinitiators and yet is readily applied at low melt viscosity using conventional hot melt equipment.

DETAILED DESCRIPTION OF THE PREFERRED EMBODIMENTS

Pressure sensitive adhesives based on acrylate ester homo- and copolymers are well known to those skilled in the art. It is to be noted that the process of the present invention is adaptable to be used with all such pressure sensitive adhesives.

Thus, the acrylate-based copolymerizable monomers which may be used include those acrylate ester monomers selected from the group consisting of the alkyl esters of acrylic and methacrylic acid wherein the alkyl groups contain 4 to 9 carbon atoms, preferably 4 to 8 carbon atoms. Such esters include n-butyl acrylate, n-pentyl acrylate, n-hexyl acrylate, n-heptyl acrylate, n-octyl acrylate, n-nonyl acrylate; their correspondingly branched isomers such as 2-ethylhexyl acrylate, etc. as well as the corresponding methacrylate esters.

Optionally, the pressure sensitive adhesive may be prepared with one or more polymerizable comonomers selected from the groups consisting of vinyl esters, vinyl ethers, vinyl halides, vinylidene halides, nitriles of ethylenically unsaturated mono- and dicarboxylic acids and their partial or full esters and ethylenically unsaturated hydrocarbons as well as with other acrylate monomers such as methyl acrylate which are not considered tacky or pressure sensitive. Examples of optional comonomers include vinyl acetate, t-octyl acrylamide, acrylic acid, vinyl ethyl ether, vinyl chloride, vinylidene chloride, acrylonitrile, maleic anhydride and styrene.

It is to be noted that the $C_4$–$C_9$ alkyl esters of acrylic or methacrylic acid will ordinarily constitute at least about 50% by weight of the total copolymer in order to ensure sufficient pressure sensitivity in the resultant adhesive. The relative amounts of the specific components making up the acrylatebased adhesive are conventional and known in the art.

The monomeric photoinitiators employed in the present invention are characterized by the formula:

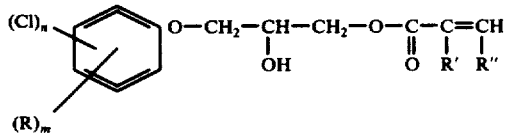

wherein $n$ is an integer having a value of 1 to 5; R is hydrogen, ethyl or methyl; $m$ is an integer defined by the expression (5-n); R' is hydrogen, methyl or ethyl and R' is hydrogen or methyl. These monomeric photoinitiators may be prepared, for example, by the reaction of approximately equimolar amounts of chlorinated phenol with a glycidyl ester of acrylic, methacrylic or crotonic acid in accordance with the process disclosed in copending application Ser. No. 595,278 filed July 14, 1975. Other methods of preparation, such as that described in U.S. Pat. No. 3,004,073, are also suitable.

Exemplary of photoinitiators useful in the present invention are the following: 3-(pentachlorophenoxy)-2-hydroxypropyl acrylate, 3-(2,4,6-trichlorophenoxy)-2-hydroxypropyl acrylate, 3-(3,4-dichlorophenoxy)-2-hydroxypropyl acrylate, 3-(2,3,4,5-tetrachlorophenoxy)-2-hydroxypropyl acrylate and corresponding methacrylates.

As will be recognized by those skilled in the art, the preparation of the interpolymer containing the acrylic copolymer and photoinitiator can be carried out using well-known free radical initiated polymerization procedures. Thus, the interpolymer can be prepared by solution, emulsion or bulk polymerization procedures; formed into a hot melt by removal of the solvent, coagulation of the latex, etc. The adhesive interpolymer may also comprise various other additives such as plasticizers, tackifiers, fillers, etc. which are conventionally used in the preparation of hot melt and or pressure sensitive adhesives.

Generally, the interpolymers produced by the present invention will contain from about 0.1 to 10.0% of the ultraviolet sensitizing component, based on the total weight of the interpolymer. However, for the purposes of the invention, it is preferred that form about 0.2 to 5.0% by weight, of the photoinitiator be employed. As previously discussed, the interpolymer should preferably have a minimum content of the $C_4$–$C_9$ alkyl esters of acrylic and methacrylic acid of 50% by weight of the total interpolymer in order to obtain adequate pressure sensitive properties. The remaining monomeric components such as methyl acrylate, t-octylacrylamide, vinyl acetate etc. will then be determined on the basis of the properties desired in the final product and the specific end-use application.

During use, the hot melt composition need only be heated to a temperature of about 120° to 180° C. to render the composition fluid and flowable and to allow the composition to remain flowable for the time required for application thereof.

If the adhesive composition is to be applied to a backing or substrate, this procedure may be accomplished using any conventional means such as roller coating, dip coating or extrusion coating. The backing onto which the hot melt composition is applied may be selected from a variety of materials including fabric, plastic film, nonwoven fiber sheets, metal sheets or foil, rubber or synthetic rubber, decorative sheets, plywood decals, etc. If the coated substrate is to be used in the form of a roll, the back of the tape is usually coated with a release backsize or abhesive coating. Double sided coating adhesive articles may also be prepared and a strippable paper or other protective means inserted if the article is to be rolled. Additionally, substrates may be laminated onto the adhesive-coating backing in situ, i.e. the hot melt coating may be applied to the backing and the substrate placed over the adhesive. Alternatively, a pressure sensitive adhesive film may be formed by applying the hot melt to a release material such as silicone coated paper; then, after curing, it may then be stripped from the release material and used as a film.

After the hot composition is applied, it may be allowed to cool to about 38°–120° C., a temperature at which it is no longer flowable or it may be cooled to room temperature prior to the radiation step.

The resulting adhesive coatings are then crosslinked (cured) by exposure to ultraviolet radiation having a wavelength within the range of 1800 to 4000 A for a period of time which is sufficient to accomplish the desired amount of crosslinking. The length of exposure will be dependent upon the nature and intensity of the radiation, the particular ultraviolet sensitizing compound and content thereof, the adhesive system, the thickness of the film, environmental factors, as well as the distance between the radiation source and the adhesive film.

Irradiation of the compositions may be accomplished by any one or a combination of methods. The composition may be exposed, for example, to actinic light from any source and of any type as long as it furnishes an effective amount of ultraviolet radiation, since the compositions of the invention activatable by actinic light will generally exhibit their maximum sensitivity in the range of about 1800 to 4000 A and preferably about 2000 to 3500 A. Suitable sources include, but are not limited to, carbon arcs, mercury-vapor arcs, fluorescent lamps with special ultraviolet light emitting phosphorus, electronic flash lamps, etc. and combinations thereof.

The time of irradiation must be sufficient to give the effective dosage. Irradiation may be carried out at any convenient temperature and most suitably carried out at room temperature for economic reasons. Distances of the radiation source from the coated substrate may range from about ⅛ to 10 inches and preferably from about ⅛ to 7 inches.

One of the advantageous aspects of the process of the present invention is that problems associated with the possibility of "over-curing" are negligible. Thus, the extent of curing observed after a period of, for example, 4–5 secs. has been found to be only minimally greater than that observed after a period of 0.5–1.5 secs. It is thus apparent that curing to within the desired molecular weight range can be achieved using conventional ultraviolet sources and exposure longer than that required to achieve a particular molecular weight will have little or no effect on the properties of the final adhesive. Moreover, since the photoinitiators employed herein are sensitive only to ultraviolet radiation and not visible light, no further curing will occur during storage of the cured adhesive composition, even in the presence of visible light.

The unique adhesive compositions formed by the present process find application in a wide variety of products where nonleachable pressure sensitive materials are required such as for bandages or other medical applications. The adhesives are also useful in the production of vinyl wall coverings, tapes, labels and decals as well as in such other applications wherein solution acrylics are presently employed. This process therefore offers as an advantage to the previously employed solution acrylics by eliminating the need for solvent removal after application of the adhesive while providing a composition possessing superior cohesive and adhesive properties. Furthermore, the resultant crosslinked adhesives are characterized by resistance to solvents in which they would ordinarily dissolve or soften, by increased Williams plasticity values and by superior pressure sensitive properties. Thus, the hot melt adhesives of this invention have melt viscosities between about 4000 and 100,000 cps., preferably from about 5000 to 25,000 cps at 180° C. The interpolymers employed herein may have a negligible or unmeasurable low standard Williams plasticity number before exposure to ultraviolet radiation. Plasticity may be defined as the property of a polymeric material which enables it to be deformed permanently and continuously without rupture, upon the application of a force thereto. This property is measured by the use of a William's Plastometer which is manufactured by Scott Testers, Inc. and is designed to conform to the standards set by ASTM Method D-926. In some cases, it is preferred that the interpolymer have negligible (0.4–1.3) plasticity before exposure and at least about 1.8 after exposure. Thus, an advantage of the method of the present invention is that it allows the use of essentially fluid, low cohesive materials or materials with no or low plasticity to be transformed into useful elastomeric adhesives of higher plasticity. The final plasticity of the adhesive is usually between 2 and 3 although where the plasticity is above this level, some added tackifiers may be provided to produce the desired properties.

The examples set forth below serve to illustrate the process of the invention in certain of its embodiments. All parts and percentages in these examples as well as throughout the specification are by weight and temperature in degrees centigrade unless otherwise specified.

In the examples the following testing procedures are employed to measure the comparative properties of the various adhesives.

Williams Plasticity (ASTM Method D926)

In determining Williams plasticity values, a film having a dry thickness of 2 to 3 mils. of the polymer being evaluated is cast onto a conventional release sheet. The dry film is peeled from the release sheet and molded into a solid cylindrical slug approximately 1.5 cm, wide, 2 cm. long and weighing exactly 1.8 gms. The slug is then conditioned for 15 minutes at a temperature of 38° C. whereupon it is inserted between the two paralleled platens of the plastometer which have also been maintained at a temperature of 38° C. The upper platen, which is weighted with 5 kg. and is attached to a micrometer which serves to measure the height of the slug after compression, is lowered onto the slug and maintained in that position for 15 minutes. The resulting micrometer readings, in millimeters, indicate the resistance to plastic flow on the part of the polymer samples being evaluated. High plasticity values are indicative of greater resistance to flow, and thus, denote a firmer polymer whereas low plasticity values are indicative of less resistance to flow, and thus, denote a softer polymer.

180° PEEL ADHESION TEST (ASTM METHOD D-1000)

This test consists of measuring the force necessary to strip or delaminate the adhesive film test sample (1 inch × 6 inch × 1.5 mils) coated on 2 mil polyester film from a stainless steel panel at a rate of pull, or withdrawal, of 12 inches per minute. An Instron Tensile Tester was used to provide the pulling force. Thus, the force necessary to effect delamination is recorded as the "180° Peel Adhesion" value. Tests were taken after only 20 minutes and then again after standing for various periods of time at the temperatures noted in the examples. Values are shown in lbs/in. with the higher values indicating the best results. It is noted that the adhesives prepared in accordance with the present invention suffer a reduction in peel, however, the values obtained after irradiation are still commercially acceptable and are more than compensated by the improvements in Williams plasticity and cohesive strength.

SHEAR ADHESION TEST (PSTC METHOD 7)

The shear strength is measured by transferring the adhesive onto a 2-mil thick polyethylene terephthalate (Mylar) or vinyl sheet (as noted in the example) at a dry weight of The coated sample is then applied to a steel panel with a 0.5 inch overlap joint. A one pound weight was suspended from the sample with the steel panel maintained vertically and the time until separation occurs is measured. The test is carried out at 23° C. and 50% relative humidity. The test is a measure of the cohesive strength and ability to maintain cohesive strength over a period of time. Thus, the adhesives showing the longest times are preferred.

EXAMPLE I

This example illustrates a process for the preparation of a hot-melt, pressure sensitive adhesive in accordance with the present invention.

A one liter, three-necked flask equipped with a thermometer, a reflux condenser, a source of mechanical agitation and slow addition funnels was initially charged with 50 grams methyl acrylate, 50 grams 2-ethylhexyl acrylate, 250 grams methyl alcohol and 1 gram t-butyl peroxypivalate.

The mixture was brought to reflux and held 15 minutes, after which the following monomer and catalyst charges were added simultaneously in increments over a three-hour period: (monomer charge) 150 grams methyl acrylate, 535 grams 2-ethylhexyl acrylate, 200 grams methyl methacrylate and 1.5 grams 3-(pentachlorophenoxy)-2-hydroxypropyl methacrylate, and (catalyst charge) 280 grams methyl alcohol and 11.5 grams t-butyl peroxypivalate.

After completion of the addition, the reaction mixture was held at reflux for two hours and discharged. The solvent was then vacuum stripped to produce the resultant saturated polymer which had a Williams plasticity number of 1.15.

The thus produced hot-melt adhesive composition was heated at 180° C., applied to release paper in an amount of 18-22 mgs/in² and allowed to cool. The coated paper was then exposed to ultraviolet radiation from a commercial 200 watt/inch ultraviolet light by means of a conveyorized sampling system at a rate of 300 feet per minute. The adhesive was tested by measuring its plasticity, peel strength and shear strength both before radiation and after 35 passes under the ultraviolet source. The following results was obtained.

|  | Before Irradiation | After Irradiation |
| --- | --- | --- |
| Williams Plasticity | 1.15 | 2.68 |
| Initial Peel 20 min. | 3.8 | 3.5 |
| 24 hrs. | 5.4 | 4.6 |
| 1 week at R.T. 20 min. | 2.9 | 2.7 |
| 24 hrs. | 4.4 | 3.7 |
| 1 week at 70° C. 20 min. | 2.7 | 2.8 |
| 24 hrs. | 4.3 | 3.4 |
| Shear Strength (4 psi hold) | 10 min. | 2 hrs. |

The results presented above indicate the properties of improved plasticity and shear strength (cohesiveness) with minimal loss in peel (adhesion) characteristic of the adhesives produced in accordance with the method of the present invention

EXAMPLES II - IV

Using the procedure, catalyst and solvent employed in Example I, pressure sensitive hot melt adhesives were prepared by coating interpolymers having the following compositions onto the desired substrates and exposing to ultraviolet radiation. The resultant adhesive was tested as described in Example I.

EXAMPLE II 63.5 grams 2-ethylhexyl acrylate
30 grams vinyl acetate 5 grams t-octylacrylamide
1.5 grams 3-(pentachlorophenoxy)-2-hydroxypropyl methacrylate
(Coating weight 18-22 mg/in² on vinyl to stainless steel)

|  | Before Irradiation | After Irradiation |
| --- | --- | --- |
| Williams Plasticity | 0.81 | 2.02 |
| Initial Peel 20 min. | 4.3 | 2.4 |
| 24 hrs. | 4.8 | 2.3 |
| 1 week at R.T. 20 min. | 3.5 | 2.1 |
| 24 hrs. | 3.9 | 1.6 |
| 1 week at 70° C. 20 min. | 0.9 | 0.6 |
| 24 hrs. | 0.9 | 0.4 |
| Shear Strength (4 psi hold) | 1.5 min. | 1 hr. |

EXAMPLE III 58.5 grams 2-ethylhexyl acrylate 30 grams vinyl acetate
10 grams t-octyl acrylamide
1.5 grams 3-(pentachlorophenoxy)-2-hydroxypropyl methacrylate
(Coating weight 18-22 mg/in² vinyl to stainless steel)

|  | Before Irradiation | After Irradiation | | |
| --- | --- | --- | --- | --- |
|  |  | 15 Passes | 25 Passes | 35 Passes |
| Williams Plasticity | 0.94 | 1.88 | 2.04 | 2.63 |
| Initial Peel 20 min. | 6.85 | 4.33 | 3.90 | 3.35 |
| 24 hours | 6.90 | 3.53 | 4.30 | 3.85 |
| Shear Strength (4 psi hold) | 4 min. | 0.5 hrs. | 1.5 hr. | 3.5 hr. |

The identical chemical composition was employed to produce an adhesive having an initial Williams plasticity of 0.75. This adhesive was also tested using a coating weight of 18-22 mg/in² with a Mylar to stainless steel bond.

|  | Before Irradiation | After Irradiation | | |
| --- | --- | --- | --- | --- |
|  |  | 20 Passes | 25 Passes | 35 Passes |
| Williams Plasticity | 0.75 | 1.34 | 1.47 | 1.51 |
| Initial Peel 20 min. (lbs/in.) | 6.5 | 2.2 | 2.8 | 2.6 |
| 24 hrs. | 6.9 | 2.3 | 2.1 | 2.2 |
| 1 week at R.T. 20 min. | 6.5 | 2.0 | 2.2 | 2.6 |
| 24 hrs. | 6.9 | 2.3 | 2.2 | 2.4 |
| 1 week at 70° C. 20 min. | 6.4 | 4.3 | 3.5 | 3.0 |
| 24 hrs. | 6.7 | 3.9 | 3.2 | 3.9 |
| Shear Strength (4 psi hold) | 3 min. | 15 min. | 2 hrs. | 3.5 hrs. |

The results of this example also show that the adhesives produced by the method of the present invention are not readily over-cured since both the plasticity and the peel values after 35 passes remain substantially the same as those observed after 25 passes.

EXAMPLE IV 24 grams 2-ethylhexyl acrylate
5 grams vinyl acetate
10 grams t-octylacrylamide
1 gram acrylic acid
58 grams butyl acrylate
2 grams 3-(pentachlorophenoxy)-2-hydroxypropyl methacrylate
(Coating weight 18-22 mgs/in² Mylar to stainless steel)

|  | Before Irradiation | After Irradiation (20 passes) |
| --- | --- | --- |
| Williams Plasticity | 0.76 | 1.86 |
| Initial Peel 20 min. | 6.0 | 1.1 |
| 24 hrs. | 5.6 | 1.0 |
| 1 week at R.T. 20 min. | 5.8 | 1.3 |

| | Before Irradiation | After Irradiation (20 passes) |
|---|---|---|
| 24 hrs. | 5.9 | 1.1 |
| 1 week at 70° C. 20 min. | 6.0 | 1.7 |
| 24 hrs. | 7.0 | 1.5 |
| Shear Strength (2 psi hold) | 2 min. | 4 hours |

It is seen from the above testing results that the pressure sensitive properties of the hot melt adhesive are greatly improved and remain superior even after storage by being treated with ultraviolet radiation in accordance with the present invention.

EXAMPLE V

Using the procedure, catalysts and solvents described in Example I, pressure sensitive hot melt adhesives may be prepared by coating copolymers formed from the ingredients listed in Table I onto the desired substrates and exposing to ultraviolet radiation.

TABLE I

| Ingredients | Composition | | | | |
|---|---|---|---|---|---|
| | A | B | C | D | E |
| 2-ethylhexyl acrylates | 57 | 58 | 57 | | 58.5 |
| methyl acrylate | 20 | 20 | 10 | | |
| ethyl acrylate | | | | | 20 |
| butyl acrylate | | | 10 | 70 | |
| methyl methacrylate | 20 | | 20 | | 20 |
| vinyl acetate | | 20 | | 20 | |
| t-octylacrylamide | | | | | |
| 2,4,6-trichlorophenoxy-2-hydroxypropyl acrylate | 3 | | | 8.5 | |
| 3-(2,3,4,5-tetrachlorophenoxy)-2-hydroxypropyl methacrylate | | 2 | | | |
| 3,4-dichlorophenoxy-2-hydroxypropyl acrylate | | | 3 | | |
| 3-pentachlorophenoxy-2-hydroxypropyl methacrylate | | | | 1.5 | 1.5 |

The resultant irradiated compositions will possess excellent adhesive properties even after storage for extended periods of time and are readily removable from any substrate to which they are adhered.

Summarizing it is seen that the addition of specific photoinitiators into the backbone of acrylate-based hot melt adhesives results in the production of prepolymeric adhesives which, when cured by exposure to ultraviolet radiation, are characterized by superior pressure sensitive properties.

Variations may be made in proportions, procedures and materials without departing from the scope of the invention as defined by the following claims.

We claim:
1. A method for the production of hot melt adhesive products having pressure sensitive properties comprising the steps of
   a. copolymerizing at least one 3-(chlorinated aryloxy)-2-hydroxypropyl ester of an alpha, beta unsaturated carboxylic acid with at least one acrylate based copolymerizable monomer,
   b. heating the resultant ethylenically unsaturated prepolymer to a temperature sufficient to render it fluid and flowable,
   c. coating the heated prepolymer onto a substrate, and
   d. exposing the coated substrate to ultraviolet radiation of wavelength 1800 to 4000 A for a period of time sufficient to crosslink the prepolymer.

2. The method of claim 1 wherein the prepolymer contains at least one monomer selected from the group consisting of the $C_4$-$C_9$ alkyl esters of acrylic and methacrylic acid.

3. The method of claim 1 wherein the acrylic monomer is present in the prepolymer in an amount of at least about 50% by weight of the total prepolymer.

4. The method of claim 1 wherein the 3-(chlorinated aryloxy-2-hydroxypropyl ester of acrylic or methacrylic acid is selected from the group consisting of 3-(pentachlorophenoxy)-2-hydroxypropyl acrylate, 3-(2,4,6-trichlorophenoxy)-2-hydroxypropyl acrylate, 3-(3,4-dichlorophenoxy-2-hydroxypropyl acrylate, 3-(2,3,4,5-tetrachlorophenoxy)-2-hydroxypropyl acrylate and the corresponding methacrylates.

5. The method of claim 1 wherein the 3-(chlorinated aryloxy)-2-hydroxypropyl ester of acrylic or methacrylic acid is present in an amount of 0.1 to 10.0% by weight of the prepolymer.

6. The method of claim 1 wherein the ethylenically saturated prepolymer is heated to a temperature of 120° –180° C. to render it fluid and flowable.

7. The method of claim 1 wherein the coated prepolymer is exposed to an ultraviolet source of 2000 to 3500 A.

8. The crosslinked pressure sensitive adhesive product prepared by the method of claim 1.

* * * * *